(12) United States Patent
Kamata et al.

(10) Patent No.: US 7,771,602 B2
(45) Date of Patent: Aug. 10, 2010

(54) METHOD AND APPARATUS FOR MANUFACTURING MAGNETIC RECORDING MEDIA

(75) Inventors: Yoshiyuki Kamata, Tokyo (JP); Katsuyuki Naito, Tokyo (JP); Akira Kikitsu, Yokohama (JP); Masatoshi Sakurai, Tokyo (JP); Masahiro Oka, Ichihara (JP)

(73) Assignees: Kabushiki Kaisha Toshiba, Tokyo (JP); Showa Denko K.K., Tokyo (JP)

( * ) Notice: Subject to any disclaimer, the term of this patent is extended or adjusted under 35 U.S.C. 154(b) by 995 days.

(21) Appl. No.: 11/475,873

(22) Filed: Jun. 28, 2006

(65) Prior Publication Data

US 2007/0000861 A1     Jan. 4, 2007

(30) Foreign Application Priority Data

Jun. 28, 2005     (JP)     ............... 2005-188388

(51) Int. Cl.
*B05D 5/12* (2006.01)
*B05D 3/00* (2006.01)
*B44C 1/22* (2006.01)
*C23F 1/00* (2006.01)

(52) U.S. Cl. .................. 216/22; 156/345.39; 427/127; 427/532

(58) Field of Classification Search .................. None
See application file for complete search history.

(56) References Cited

U.S. PATENT DOCUMENTS

| 4,662,985 | A | 5/1987 | Yoshida et al. |
| 5,516,031 | A | 5/1996 | Nishikawa et al. |
| 6,238,582 | B1 | 5/2001 | Williams et al. |
| 6,564,445 | B1* | 5/2003 | Hashimoto et al. ....... 29/603.14 |
| 6,841,220 | B2* | 1/2005 | Onoe et al. ................ 428/66.7 |
| 7,147,790 | B2* | 12/2006 | Wachenschwanz et al. .... 216/22 |
| 7,186,348 | B2* | 3/2007 | Chen et al. ................ 216/22 |
| 7,273,563 | B2* | 9/2007 | Hattori et al. ............. 216/22 |
| 7,300,595 | B2* | 11/2007 | Suwa et al. ............... 216/22 |

(Continued)

FOREIGN PATENT DOCUMENTS

JP     59-096643     6/1984

(Continued)

OTHER PUBLICATIONS

Austrian Search Report dated Aug. 13, 2007.

(Continued)

*Primary Examiner*—Allan Olsen
(74) *Attorney, Agent, or Firm*—Pillsbury Winthrop Shaw Pittman, LLP

(57) ABSTRACT

According to one embodiment, a method for manufacturing a magnetic recording medium includes forming patterns having protrusions and recesses of a ferromagnetic material onto a recording track section and a servo section on a substrate, forming a flattening film, a top surface of which is higher than that of the protrusion of the ferromagnetic material, onto the ferromagnetic material, and performing ion beam etching onto the flattening film up to a top surface of the protrusion of the ferromagnetic material, and determining an end point of flattening etching on the basis of a change in the total number of incident particles by means of an ion counter installed so as to be at an angle θ with respect to a perpendicular direction to the substrate in accordance with a material of the flattening film.

2 Claims, 6 Drawing Sheets

U.S. PATENT DOCUMENTS

| | | | |
|---|---|---|---|
| 7,488,429 B2* | 2/2009 | Okawa et al. | 216/22 |
| 2002/0039264 A1* | 4/2002 | Ohsawa et al. | 360/322 |
| 2003/0038106 A1 | 2/2003 | Covington et al. | |
| 2005/0219744 A1* | 10/2005 | Feldbaum et al. | 360/126 |
| 2005/0231856 A1* | 10/2005 | Kao et al. | 360/324.11 |
| 2007/0068797 A1* | 3/2007 | Jayasekara | 204/192.34 |
| 2007/0245545 A1* | 10/2007 | Pentek et al. | 29/603.13 |
| 2008/0040914 A1* | 2/2008 | Kao et al. | 29/603.15 |

FOREIGN PATENT DOCUMENTS

| | | |
|---|---|---|
| JP | 03-253586 | 11/1991 |
| JP | 06-244150 | 9/1994 |
| JP | 07-221441 | 8/1995 |
| JP | 10-209128 | 8/1998 |
| JP | 2929899 B2 | 8/1999 |
| JP | 11-265878 | 9/1999 |
| JP | 2000-195042 | 7/2000 |
| JP | 2003-075378 | 3/2003 |

OTHER PUBLICATIONS

Japanese Office Action dated Dec. 1, 2009.

* cited by examiner

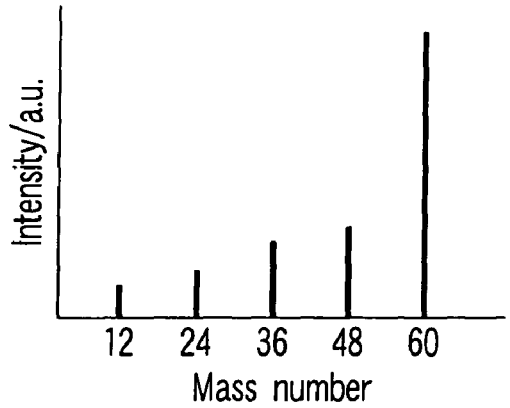
F I G. 1A
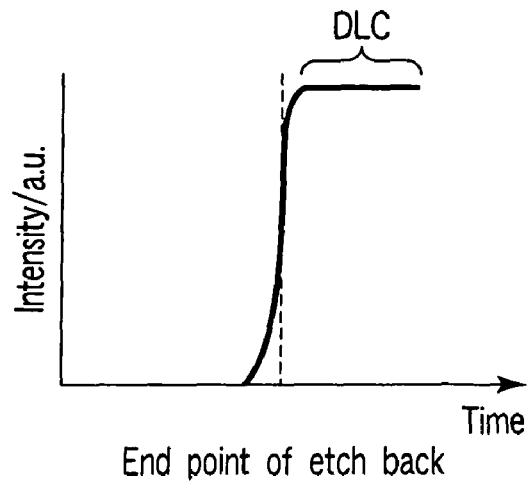
F I G. 1B
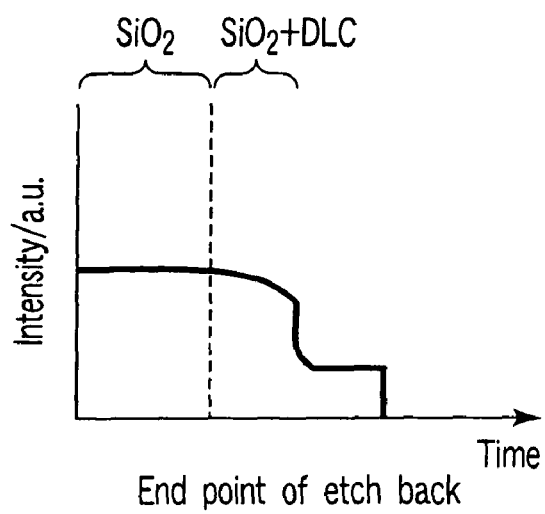
F I G. 1C

METHOD AND APPARATUS FOR MANUFACTURING MAGNETIC RECORDING MEDIA

CROSS-REFERENCE TO RELATED APPLICATIONS

This application is based upon and claims the benefit of priority from Japanese Patent Application No. 2005-188388, filed Jun. 28, 2005, the entire contents of which are incorporated herein by reference.

BACKGROUND

1. Field

One embodiment of the invention relates to a method and apparatus for manufacturing a magnetic recording medium, and more specifically, a method and apparatus for manufacturing a discrete track recording media.

2. Description of the Related Art

To improve tracks of a hard disk drive (HDD), the problem of interference between adjacent tracks has become obvious. In particular, reduction in write-blur due to a fringe effect of a write head magnetic field is an important technical problem. A discrete track recording media (DTR media) in which recording tracks are physically separated can reduce a side-erase phenomenon at the time of writing, a side-read phenomenon that pieces of information in adjacent tracks are mixed up at the time of reading. Consequently, it is possible to greatly improve a density in the cross-track direction, which can provide a magnetic recording medium onto which high-density recording is possible. However, in a case of a DTR media having patterns of protrusions and recesses on the surface thereof, the problem that it is extremely difficult to write and read by using a low-flying head is brought about. Then, it is necessary to completely flatten the protrusions and recesses by forming a flattening film and etching back the film.

On the other hand, in an HDD, a distance (spacing) between a surface of a recording medium and a read/write head has great effect on a signal-to-noise ratio (SNR). In a state in which a flattening film remains above a ferromagnetic recording layer, spacing is made greater, and an SNR declines (an SNR declines exponentially with spacing). When a flattening film is over-etched, spacing is made favorable, but a magnetic substance is damaged, so that an SNR declines. In a case where an R/W evaluation is performed with a read/write head with a flying height of 12 nm, any readout signal cannot be observed if the flattening film of 10 nm or more remains on a diamond-like carbon (DLC) protective film formed above the ferromagnetic recording layer. Further, when 10 nm or more of the ferromagnetic recording layer (half of the thickness of the ferromagnetic recording layer) is etched by over-etch back, any readout signal cannot be observed. Accordingly, a highly accurate method for detecting an end point of etch-back is necessary to prevent SNR from declining.

However, in a flattening film forming step and an etch-back step for a DTR media under the present status, it is impossible to high-accurately detect an end point of etch-back due to many unstable factors. Specifically, there are problems that a deposition rate of an embedding material by bias sputtering is unstable at the time of forming a flattening film and that an etching rate is unstable because a nonmagnetic material eliminated by etch-back is redeposited in a large quantity to an inner wall of an etching apparatus. Accordingly, in detection of an end point of time-controlled etch-back based on an etching rate, it is impossible to detect an end point of etch-back high-accurately with high-reproducibility.

As a method except for the detection of an end point of time-controlled etch-back based on an etching rate, there is a method in which an end point is detected by carrying out analysis on residual gas in a process chamber in an etch-back step.

In Jpn. Pat. Appln. KOKAI Publication No. 10-209128, there is described a method in which a silicon nitride film is formed as a film to be detected under a spin-on-glass (SOG) film serving as a flattening film in a process of manufacturing a semiconductor apparatus, and an end point of etch-back is determined by monitoring emission of $N_2$ from the film to be detected in the process of etch-back. In Jpn. Pat. Appln. KOKAI Publication No. 6-244150, there is described a method in which a silicon oxide film containing no hydrogen and a silicon oxide film containing hydrogen are laminated in a process of manufacturing a semiconductor apparatus, and an end point of etch-back is detected by monitoring emission of hydrogen atoms in a plasma at the time of etching one of the laminated films by using the plasma.

In this way, in a process of manufacturing a semiconductor, a plasma process in which emission occurs (for example, reactive ion etching (RIE) or the like) can be used, and additionally high sensitivity can be obtained with respect to even a slight change because amplification is possible by using an electron multiplier or the like. However, because ion beam etching without emission is used in a process of manufacturing a DTR media, an end point of etch-back cannot be detected by monitoring emission.

Jpn. Pat. Appln. KOKAI Publication No. 11-265878 describes a method in which, a quadrupole mass spectrometer (Q-Mass) is built into a process chamber, and an end point of etch-back is detected by monitoring a change over time in peaks of the maximum intensity mass number corresponding to a material composition of a flattening film. In Jpn. Pat. Appln. KOKAI Publication No. 11-265878, an end point can be detected with high-sensitivity because a peak intensity of SiBr (mass number 107) to be detected is great.

Because a peak intensity of a material of a flattening film to be used for a DTR media is low, however, sensitivity to detection of an end point greatly declines.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIGS. 1A, 1B and 1C are graphs each showing an example of detection of an end point of etch-back by using Q-Mass spectroscopy;

DETAILED DESCRIPTION

Figure 2:
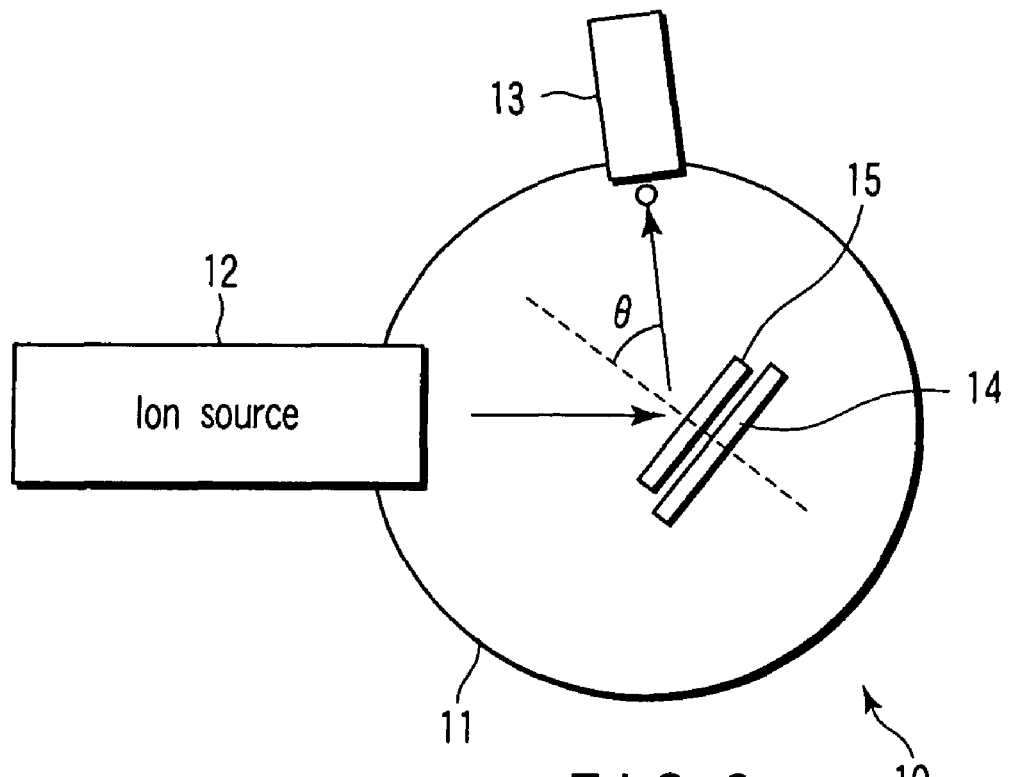
FIG. 2 is a schematic diagram showing an ion beam etching apparatus for use in a method for manufacturing a magnetic recording medium according to an embodiment of the present invention.

Various embodiments according to the invention will be described hereinafter with reference to the accompanying drawings. In general, according to one embodiment of the present invention, there is provided a method for manufacturing a magnetic recording medium, comprising: forming patterns having protrusions and recesses of a ferromagnetic material onto a recording track section and a servo section on a substrate; forming a flattening film, a top surface of which is higher than that of the protrusion of the ferromagnetic material, onto the ferromagnetic material; and performing ion beam etching onto the flattening film up to a top surface of the protrusion of the ferromagnetic material, and determining an end point of flattening etching on the basis of a change in the total number of incident particles by means of an ion counter installed so as to be at an angle θ with respect to a perpendicular direction to the substrate in accordance with a material of the flattening film.

In a prior art, an analysis on residual gas has been performed by installing a Q-mass at an arbitrary position in a process chamber. Description will be given to an example in which an attempt is made to detect an end point of etch-back in a process of manufacturing a DTR media by using a Q-mass spectroscopy in the prior art. This example assumes a case in which $SiO_2$ is used as a flattening film, and etch-back is performed up to DLC on the top surface of the protrusion of the ferromagnetic material. Q-Mass peaks are shown in FIG. 1A. In FIG. 1A, the highest peak is recognized at mass number 60. As shown in FIG. 1C, however, $SiO_2$ and DLC are mixed at a peak at mass number 60. Accordingly, an end point of etch-back cannot be detected in high accuracy if the peak at mass number 60 is monitored. A peak at mass number 12 in FIG. 1A can be considered as substantially DLC (FIG. 1B). However, intensity of this peak is too weak to be used for highly accurate detection of an end point of etch-back.

Etching by an Ar ion beam is performed by exchanging energy between an Ar ion accelerated by an electric field and an object to be etched. Then, the present inventors have focused attention on the fact that a direction and a quantity (sputtering yield) to be sputtered vary depending on a material of an object to be etched.

Here, description will be given to an example of an ion beam etching apparatus for use in a method for manufacturing a magnetic recording medium according to the present invention with reference to FIG. 2. The ion beam etching apparatus 10 has a process chamber 11, an ion source 12 attached to the process chamber 11, a quadrupole mass spectrometer (Q-Mass) 13 attached to the process chamber 11, and a rotary stage 14 installed in the process chamber 11. A substrate 15 to be etched back is held on the rotary stage 14.

The ion source 12 may be, for example, an electronic cyclotron resonance (ECR) system. This system is favorable because not only Ar but also reactive gases $O_2$, $SF_6$, $CF_4$, $CHF_3$, $C_2F_6$ and the like are ionized and accelerated by an electric field, thereby forming ion beams. A convenient system may include a system in which a gas is ionized while thermoelectrons are generated by igniting a filament, and are confined with a magnetic field generated from a magnet that surrounds the ion source. A neutralizer filament is arranged at an outlet of the ion source, and accelerated ions are neutralized, which can improve a distribution of an ion beam reaching a sample surface.

The rotary stage 14 can freely set an angle θ of the Q-Mass 13 with respect to the perpendicular direction to the substrate 15, and an appropriate angle θ can set in accordance with a material desired to be flattening-etched.

Figure 3:
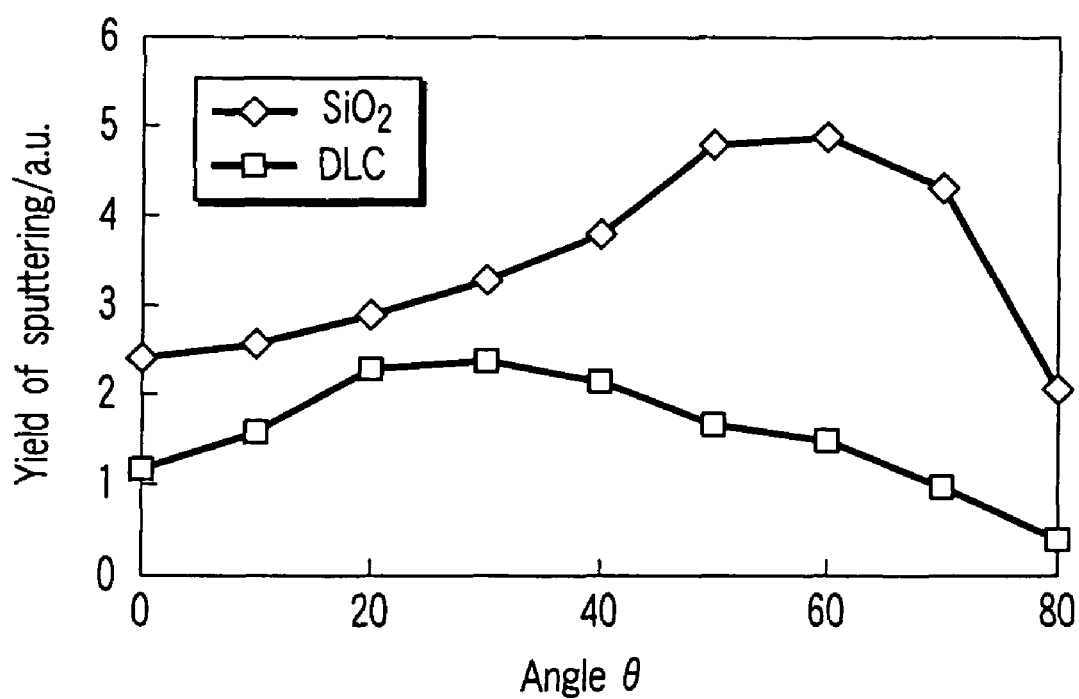
FIG. 3 is a graph showing dependences on an angle θ of sputtering yields of $SiO_2$ and DLC.

FIG. 3 shows a relationship between an angle θ of the Q-mass with respect to the perpendicular direction to the substrate in the ion beam etching apparatus and a sputtering yield of an object to be etched. The object to be etched (a flattening film) is $SiO_2$ or DLC.

As clear from FIG. 3, the sputtering yield is maximized at θ=50° to 70° in a case of $SiO_2$. In a case of DLC, on the other hand, the sputtering yield is maximized at θ=20° to 40° although an overall sputtering yield is lower than that of $SiO_2$. $Al_2O_3$ and Si denote the same tendency as $SiO_2$. Pt, Pd, Ti, Ta, Ru, and ferromagnetic alloy such as CoCrPt denote the same tendency as C. To exploit a characteristic of those materials, a type of particles to be introduced into the Q-Mass can be limited to some extent by installing in advance the Q-Mass in a direction of the angle θ in which a sputtering yield grows. For example, in a case of etch-back onto $SiO_2$, it may be said that a peak at mass number 60 shows substantially $SiO_2$ when the Q-Mass is installed in the direction of the angle θ of 60° and mass spectrometry is performed. This is because the sputtering yield of DLC at the angle θ of 60° is extremely smaller than that of $SiO_2$. Although there is a characteristic that a direction and a quantity (sputtering yield) to be sputtered vary in accordance with a material of an object to be etched, this does not depend on an angle of incidence of ions with respect to the substrate. In general, sputtered particles recoil in a direction of angle −α when an angle of incidence of ion is α. However, there is energy loss due to heat or the like actually, which broadens the angle. This is the reason why an optimal angle is broadened in a range of about 20° in the graph showing angular dependence of the sputtering yield.

In consideration of the above tendencies, it has been found that the angle θ is fixed in accordance with a material to be etched back, and for example, by monitoring a change over time in a spectral area (a sum of all peak intensities) which is obtained by the Q-Mass, an end point of flattening etching can be determined in high accuracy. When an attempt is made to determine an end point of flattening etching of $SiO_2$ by using the method described in Jpn. Pat. Appln. KOKAI Publication No. 10-209128, a peak at mass number 44 is to be monitored, but accuracy is made poor because the peak intensity itself is low. However, when a Q-Mass probe is fixed to a position at the angle θ=60° and a change over time in a spectral area is monitored, sensitivity which is ten times as higher as that in the method in Jpn. Pat. Appln. KOKAI Publication No. 10-209128 can be obtained. Note that, although the description has been given by using the Q-Mass for comparison with the prior art, a change over time in the total number of particles (a spectral area) etched toward a predetermined direction is to be monitored in detection of an end point of etch-back in the present invention as described above, and there is no need to employ spectroscopy. More specifically, not only the Q-Mass, but also one functioning as an ion counter can be used, and it may be an easy-to-use type, for example, a partial pressure vacuum analyzer or the like.

Figure 4A:
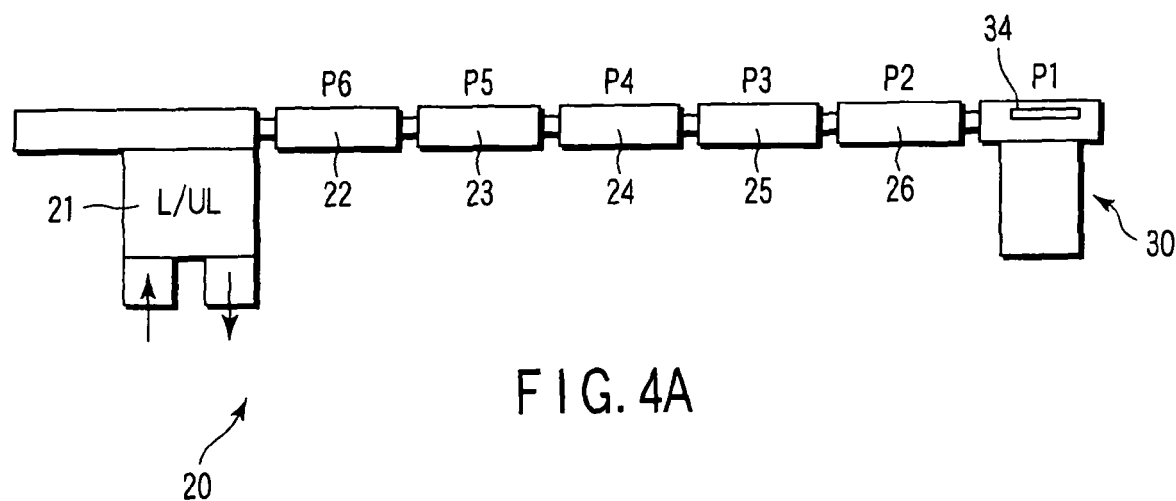
FIGS. 4A and 4B are schematic diagrams of an apparatus for manufacturing a DTR media according to another embodiment of the present invention.
Figure 4B:
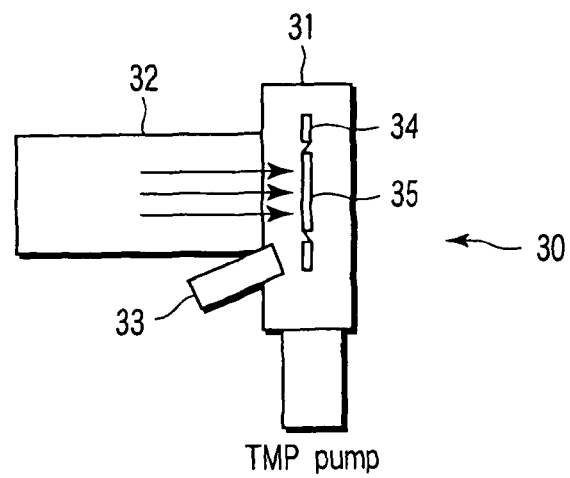

FIGS. 4A and 4B are schematic diagrams of an apparatus for manufacturing a DTR media according to another embodiment of the present invention. This apparatus is obtained by altering a sputtering deposition system for HDD (for example, an ANELVA C3010) so as to enable flattening etching in accordance with the method according to the present invention. The apparatus 20 has a load/unload chamber (L/UL) 21, sputtering deposition chambers 22 to 26 (P6 to P2) for HDD, and an ion beam etching apparatus 30. A sample can move among the chambers consistently in a vacuum. The ion beam etching apparatus 30 has an etching chamber 31, an ion source 32 attached to the chamber 31, a Q-Mass 33 attached to the chamber 31, and a carrier 34 installed in the chamber 31. A substrate 35 to be etched back is held by the carrier 34. In the ion beam etching apparatus 30 of FIG. 4B, the ion source 32 is installed so as to be perpendicular to the substrate 35 held by the carrier 34, and the carrier 34 does not have a rotary mechanism. This is because the mass productivity is taken into consideration. Further, the Q-Mass 33 is fixed in a direction of a predetermined angle θ (θ=50 to 70° in a case of $SiO_2$, and θ=20 to 40° in a case of DLC) with respect to the perpendicular direction to the substrate 35 in accordance with a flattening film.

Hereinafter, an example of a method for manufacturing a magnetic recording medium according to the present invention will be described in detail with reference to FIGS. 5A, 5B, 5C, 5D and 5E.

Figure 5A:
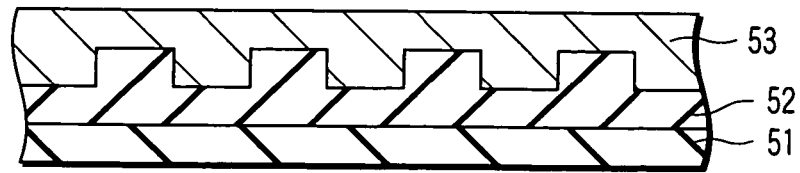
FIGS. 5A, 5B, 5C, 5D and 5E are views each showing a step of a method for manufacturing a magnetic recording medium according to an embodiment of the present invention.

First, as shown in FIG. 5A, an imprint resist layer 52 is formed on a substrate 51, and patterns are transferred by pressing a stamper 53, in which recording tracks and servo information are formed by patterns of protrusions and recesses, onto the imprint resist layer 25 at 2000 bar for 60 seconds. For example, a glass substrate is used as the substrate, and Spin-On-Glass (SOG) which is converted into $SiO_2$ by being sintered at a high temperature is used as the imprint resist.

Figure 5B:
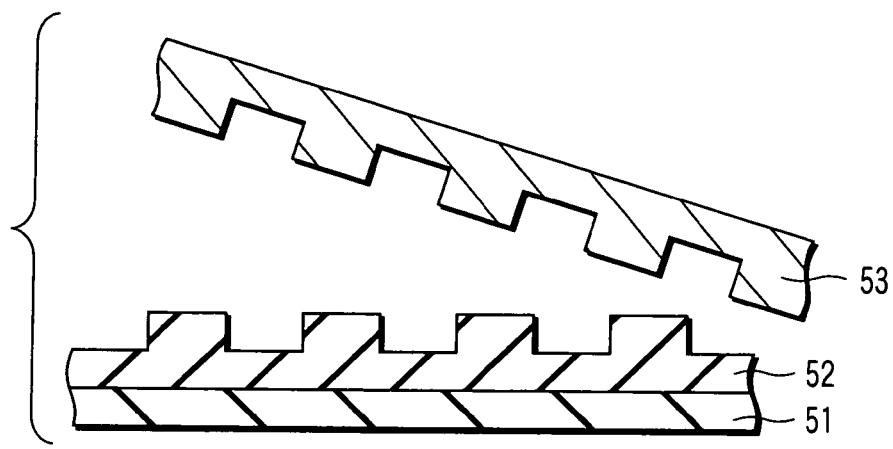

Next, as shown in FIG. 5B, the stamper 53 is removed, and thereafter, high-temperature sintering at 450° C. or more, or oxygen exposure treatment is performed in order to maintain the patterned configuration of protrusions and recesses.

Figure 5C:
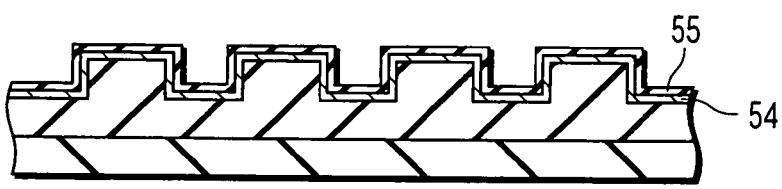

Thereafter, as shown in FIG. 5C, a metal thin film 54 is formed on the imprint resist layer 52 having the patterns of protrusions and recesses transferred thereon. The metal thin film 54 to be formed is formed by a general deposition method for a HDD recording medium (for example, sputtering). For example, CoZrNb film of 60 nm as a soft magnetic layer, Ru film of 20 nm as an underlayer for orientation control, and a film of 20 nm obtained by adding a slight amount of $SiO_2$ to CoCrPt as a ferromagnetic recording layer are stacked. The ferromagnetic recording layer may be a longitudinal film or a perpendicular film. A perpendicular film is rather preferable in order to carry out high-density recording. DLC is formed to be a film of 4 nm as a protective layer 55 on the metal thin film 54.

Figure 5D:
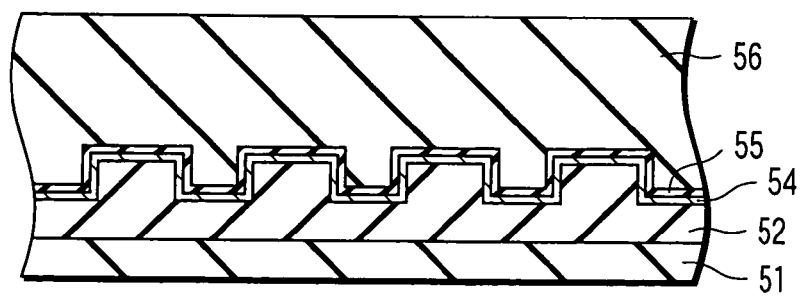

Subsequently, a flattening film 56 is formed as shown in FIG. 5D. A material without interaction with the ferromagnetic recording layer 54 is preferable as the flattening film 56. For example, materials such as $SiO_2$, $Al_2O_3$, $TiO_2$, C, Pd, Pt, Ta, Ti and Ru can be used. Sputtering is preferable as a deposition method, and the flattening film may be formed by bias sputtering which is performed while biasing the substrate, an ion beam deposition (IBD) method, or the like.

After the flattening film 56 is formed, etch-back is performed by using the ion beam etching apparatus according to the present invention shown in FIG. 2 or 4B. Etch-back is aimed at making a shape of cross section that the DLC protective film 55 above the ferromagnetic recording layer 54 and the flattening film 56 are in plane. The DLC protective film 55 may also be removed by an etch-back step.

By using the ion beam etching apparatus of FIG. 2, etch-back has been performed while an angle θ is changed in order to find an angle θ suitable for a material of the flattening film.

A suitable angle θ when $SiO_2$ is used as the flattening film will be described. First, detection of an end point of etch-back was evaluated with the Q-Mass probe being fixed at an angle θ of 60°. A Q-Mass spectral area intensity denoted 5 (no unit) as long as flattening etching was performed by irradiating an Ar ion beam. After 10 minutes, the Q-Mass spectral area intensity rapidly declined, and thus, the flattening etching was stopped. Thereafter, a DLC protective film was formed again, and a lubricant agent was applied thereto. When readout test was performed with respect to an HDD which has manufactured the obtained DTR media using a read/write head with a flying height of 12 nm, clear readout signals could be obtained. 100 DTR media were manufactured and readout signal intensities at similar levels were obtained with respect to all the media.

Next, on examination while the angle θ was varied between 10° and 80°, Q-Mass spectral area intensities at θ=10° to 40° were 4.0 or less, and sufficient sensitivity could not be obtained. A Q-Mass spectral area intensities at θ=50° to 70° were 4.0 or more, making it possible to obtain sufficient sensitivity for detection of an end point. A Q-Mass spectral area intensity at θ=80° was about 2.0, making it impossible to obtain sufficient sensitivity. As a result, it can be understood that the suitable angle θ when $SiO_2$ is used as the flattening film should satisfy the condition of $50° \leq θ \leq 70°$.

For comparison, flattening etching was performed by a time-control method. When 100 samples on which flattening etching has been stopped up to 10 minutes were manufactured, and R/W evaluation was performed thereon, clear readout signals were obtained from about 60 samples, and there have been about 10 samples whose signal intensities were not more than half thereof. Accordingly, it can be understood that, in detection of an end point of etch-back by the conventional time control method, it is difficult to suppress this dispersion.

When C is used as the flattening film, it is sufficient to orient the Q-Mass probe in a direction at an angle θ of 30°. Because a sputtering yield of C is low, the sensitivity is weakened as compared with that of $SiO_2$. However, because many mass spectral peaks of C come out (12, 24, 36, 48, or the like), a spectral area intensity-to-noise (SN) is made large. A Q-Mass spectral area intensity denoted 2.6 (no unit). On examination while the angle θ was varied between 10° and 80°, a Q-Mass spectral area intensity at θ of 10° was about 1.0, making it impossible to obtain sufficient sensitivity. A Q-Mass spectral area intensities at θ=20° to 40° were 2.0 or more, making it possible to obtain sufficient sensitivity for detection of an end point. A Q-Mass spectral area intensities at θ=50° to 80° were 2.0 or less, making it impossible to obtain sufficient sensitivity. As a result, it can be understood that the suitable angle θ when C is used as the flattening film satisfies the condition of $20° \leq θ \leq 40°$.

When Ti or Ta was used as the flattening film, a Q-Mass spectral area intensity at θ of 30° denoted 3.0 (no unit). When Ru, Pt, or Pd was used as the flattening film, a Q-Mass spectral area intensity at θ of 30° denoted 5.0 (no unit). The angular dependence of those materials was the same as that of C.

When $Al_2O_3$ is used as the flattening film, a Q-Mass spectral area intensity at θ of 60° denoted 2.8 (no unit) in the same manner as in the case of $SiO_2$. Although the sensitivity slightly declines because a sputtering yield is low in the same manner as in the case of C, there is no problem in detection of an end point. When Si was used as the flattening film, a Q-Mass spectral area intensity at θ of 60° denoted 4.8 (no unit) in the same manner as in the case of $SiO_2$. The angular dependence of those materials was the same as that of $SiO_2$.

Next, a modified example of a method for manufacturing a DTR media according to the present invention will be described. The modified example is different from the manufacturing method described above in that a substrate itself is processed.

In this modified example, the same processes as those up to FIG. 5B in the above-described manufacturing method are performed. In this modified example, novolac photoresist (for example, s1801 or the like) or SOG (Spin-On-Glass) commonly used as an imprint resist can be used.

As shown in FIG. 5B, an imprint residue is removed (so-called bottom removal) by reactive ion etching (RIE) onto the imprint resist 52 on which the patterns has been transferred (not shown). When SOG is used as the imprint resist, $SF_6$, $CF_4$, $CHF_3$, $C_2F_6$ or the like can be used as a reactive gas. In a case of novolac photoresist, an oxygen gas is suitable.

After the resist residue is removed, ion milling is performed using the resist as a mask (not shown). As ion milling, Ar ion milling is suitable with any material. It may be RIE using a Cl gas, or may be RIE using a $CO+NH_3$ gas.

Figure 5E:
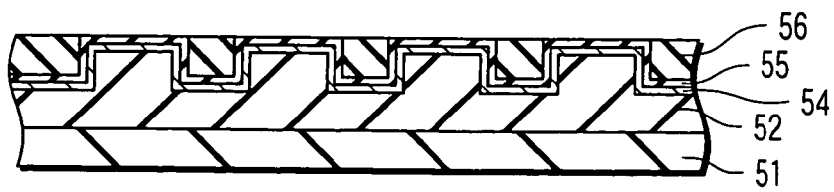
Figure 6:
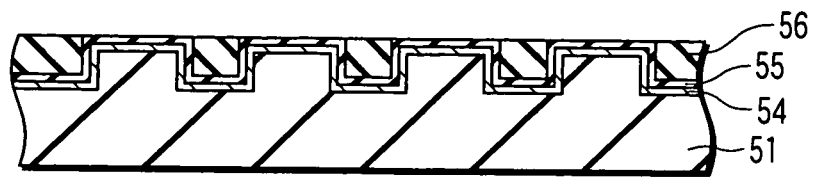
FIG. 6 is a cross-sectional view of an example of a DTR media manufactured by a manufacturing method of substrate etching type according to another embodiment of the present invention.

Thereafter, a residual resist remaining on the top portion of the substrate is removed (not shown), and then, a DTR media is manufactured by a method of substrate etching type as shown in FIG. 6 by carrying out the steps of FIGS. 5C, 5D and 5E described above.

Next, a method for manufacturing a DTR media by a method of magnetic film etching type will be described with reference to FIGS. 7A, 7B, 7C, 7D, 7E, 7F, 7G, 7H and 7I.

Figure 7A:
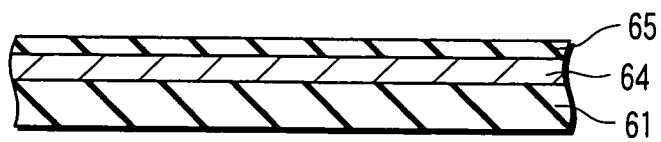
FIGS. 7A, 7B, 7C, 7D, 7E, 7F, 7G, 7H and 7I are views each showing a step of a method of magnetic film etching type for manufacturing a magnetic recording medium according to an embodiment of the present invention.

As shown in FIG. 7A, a metal thin film 64 is formed on a substrate 61, and then, a protective film 65 is formed thereon. For example, on a glass substrate, CoZrNb film of 60 nm as a soft magnetic layer, Ru film of 20 nm as an underlayer for orientation control, a film of 20 nm obtained by adding a slight amount of $SiO_2$ to CoCrPt as a ferromagnetic recording layer, and DLC film of 4 nm as the protective film 65 are stacked.

Figure 7B:
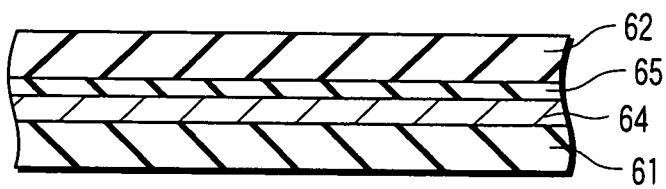
Figure 7C:
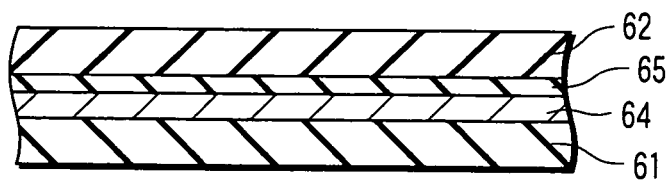
Figure 7D:
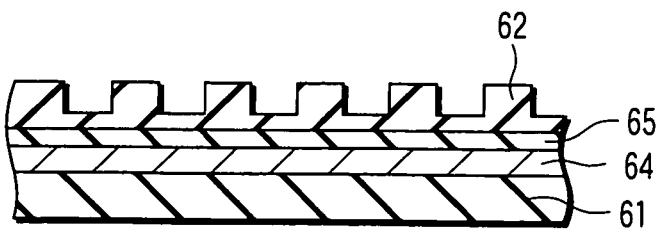

Thereafter, as shown in FIG. 7B, novolac photoresist (for example, s1801 or the like) or SOG commonly used as an imprint resist 62 is applied onto the protective layer 65 by spin-coating. Then, imprint is performed by pressing a stamper 63 onto the imprint resist layer 62, as shown in FIGS. 7C and 7D.

Figure 7E:
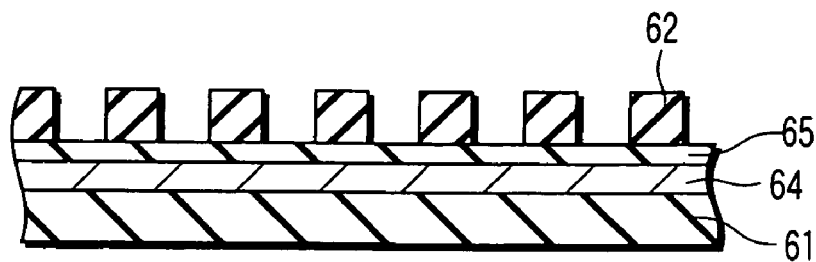

Next, as shown in FIG. 7E, removal of imprint residue (so-called bottom removal) is performed by RIE with respect to the imprint resist 62 having the patterns transferred thereon (not shown). When SOG is used as the imprint resist 62, $SF_6$, $CF_4$, $CHF_3$, $C_2F_6$ or the like can be used as a reactive gas. In a case of novolac photoresist, an oxygen gas is suitable.

Figure 7F:
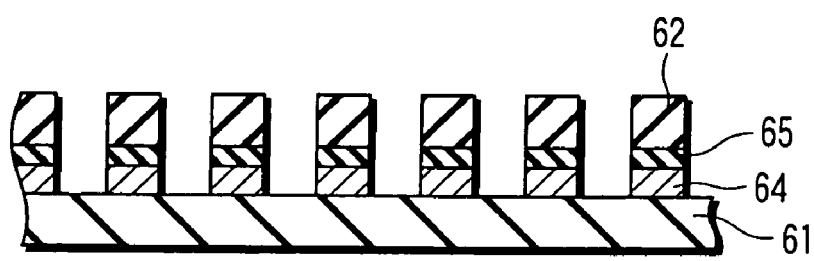

As shown in FIG. 7F, etching onto the protective film 65 and the metal thin film 64 is performed using the imprint resist layer 62 as a mask. As etching, Ar ion milling is suitable. It may be RIE using a Cl gas, or may be RIE using a $CO+NH_3$ gas.

Figure 7G:
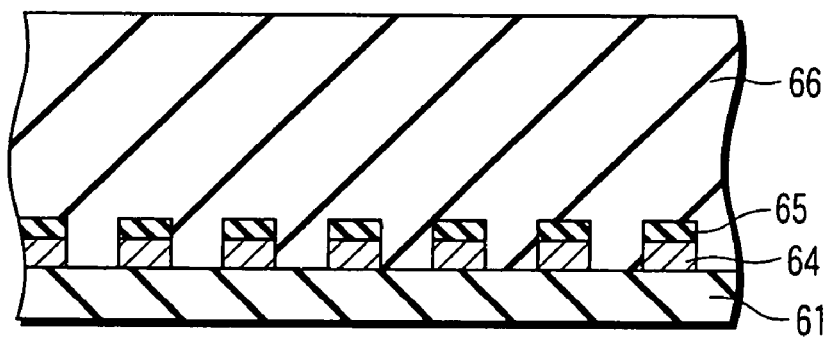

As shown in FIG. 7G, a residual resist remaining on the top portion of the ferromagnetic material is removed. When an oxygen plasma process is used as a step of removing a residual resist remaining on the top portion of the ferromagnetic material, there is no protective film DLC on the top portion of the ferromagnetic material. However, in removal using a reactive gas such as $SF_6$, $CF_4$, $CHF_3$ or $C_2F_6$, the DLC protective film remains on the top portion of the ferromagnetic material. Next, a flattening film 66 is formed.

Figure 7H:
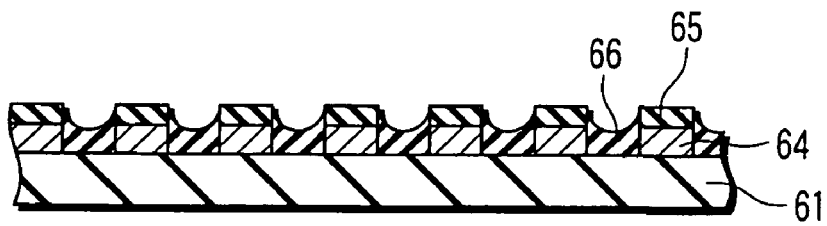
Figure 7I:
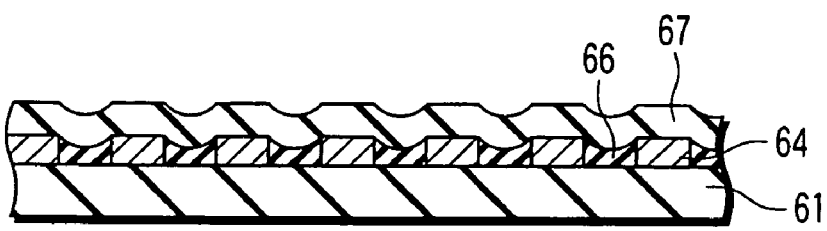

Thereafter, a medium as shown in FIG. 7H is obtained by flattening etching onto the flattening film 66. Detection of an end point of etch-back has been performed by installing an ion counter so as to be at an angle θ optimum for a material of the flattening film 66 as described above. As shown in FIG. 7I, a DLC layer 67 may be newly formed on the substrate after etch-back.

Hereinafter, materials used for the respective layers and a laminated structure of the respective layers of the magnetic recording medium according to the embodiment of the invention will be described.

<Substrate>

Examples of a substrate include a glass substrate, an Al-based alloy substrate, a ceramic substrate, a carbon substrate, and an Si single-crystal substrate. As a glass substrate, amorphous glass or single-crystal glass can be used. Examples of amorphous glass include soda lime glass and aluminosilicate glass. Examples of crystallized glass include lithium crystallized glass. A ceramic substrate may be, for example, a sintered body consisting substantially of aluminum oxide, aluminum nitride, silicon nitride, or the like, or one obtained by fiber-reinforcing those sintered bodies. An Si single-crystal substrate, i.e., a silicon wafer may have an oxide film on the surface thereof. Further, one obtained by forming an NiP layer on the above-described metal substrate or a nonmetal substrate by plating or sputtering can be used.

<Soft Underlayer>

When a perpendicular magnetic recording medium is manufactured, that is formed as a so-called perpendicular two-layer medium having a perpendicular magnetic recording layer on a soft underlayer (SUL). The soft underlayer of the perpendicular two-layer medium is provided for allowing a writing magnetic field from a magnetic pole to pass through, and for allowing the recording magnetic field to return to a return yoke arranged in the vicinity of the magnetic pole. Namely, the soft underlayer serves as one part of functions of a write head, and functions as a part of improving a writing efficiency by applying a precipitous perpendicular magnetic field to the recording layer.

As the soft underlayer, a high permeability material including at least one of Fe, Ni and Co is used. Examples of the material include an FeCo-based alloy such as FeCo or FeCoV; an FeNi-based alloy such as FeNi, FeNiMo, FeNiCr, or FeNiSi; an FeAl-based and FeSi-based alloy such as FeAl, FeAlSi, FeAlSiCr, FeAlSiTiRu, or FeAlO; an FeTa-based alloy such as FeTa, FeTaC, or FeTaN; and an FeZr-based alloy such as FeZrN.

As the soft underlayer, a material may be used which has a microcryatalline structure such as FeAlO, FeMgO, FeTaN, or FeZrN containing 60 at % or more of Fe, or a granular structure in which fine crystal particles are dispersed in a matrix.

Examples of the material of the soft underlayer further include a Co alloy containing Co and at least one of Zr, Hf, Nb, Ta, Ti and Y. 80 at % or more of Co is preferably contained therein. When such a Co alloy is formed to be a film by sputtering, an amorphous layer is easy to form. An amorphous soft magnetic material has no crystalline magnetic anisotropy, crystalline defect, or grain boundary, and thus exhibits an extremely excellent soft magnetisation. By using an amorphous soft magnetic material, an attempt can be made to make a noise of a medium lower. Examples of a suitable amorphous soft magnetic material include CoZr-, CoZrNb-, and CoZrTa-based alloys.

Under the soft underlayer, an underlayer may be also provided in order to improve the crystallinity of the soft underlayer, or to improve the adherence of the soft under layer to the substrate. Examples of a material of the underlayer include Ti, Ta, W, Cr and Pt, or an alloy containing those, or an oxide or a nitride thereof.

An intermediate layer composed of a nonmagnetic material may be provided between the soft underlayer and the perpendicular magnetic recording layer. A role of the intermediate layer is to cut off exchange coupling interaction between the soft magnetic underlayer and the recording layer, and to control the crystallinity of the recording layer. Examples of a material of the intermediate layer include Ru, Pt, Pd, W, Ti, Ta, Cr, and Si, or an alloy containing those, or an oxide or a nitride thereof.

In order to prevent a spike noise, the soft underlayer may be comprising of a plurality of layers, and have a Ru film having thickness of 0.5 to 1.5 nm interposed therebetween, whereby anti-ferromagnetic coupling may be carried out. In addition, the soft magnetic layer may be exchange coupled to a hard magnetic film having in-plane anisotropy, such as CoCrPt, SmCo, or FePt, or a pinning layer composed of an antiferromagnetic material such as IrMn or PtMn. In this case, a magnetic layer, for example, Co, or a nonmagnetic layer, for example, Pt may be laminated above and under an Ru layer in order to control an exchange coupling force.

<Perpendicular Magnetic Recording Layer>

As the perpendicular magnetic recording layer, for example, a material is used which consists substantially of Co, contains at least Pt, Cr as needed, and further includes an oxide (for example, a silicon oxide, a titanium oxide). In the perpendicular magnetic recording layer, it is preferred for magnetic crystal particles to have a columnar structure. In the perpendicular magnetic recording layer having such a structure, the orientation and the crystallinity of the magnetic crystal particles are satisfactory, and as a result, a signal-to-noise ratio (SNR) suitable for high-density recording can be obtained. In order to obtain the structure described above, a quantity of oxide is important. A content of oxide is preferably 3 mol % or more and 12 mol % or less, and more preferably 5 mol % or more and 10 mol % of the total amount of Co, Pt, and Cr. When the content of oxide in the perpendicular magnetic recording layer is within the above-described range, the oxide is precipitated at the periphery of the magnetic particles, which can be isolated and become fine. When the content of oxide is over the above-described range, the oxide remains in the magnetic particles, which deteriorates the orientation and the crystallinity of the magnetic particles. Further, the oxide is precipitated above and under the magnetic particles, and as a result, preventing the formation of a columnar structure in which the magnetic particles penetrate through the perpendicular magnetic recording layer in the perpendicular direction. On the other hand, the content of oxide, which is less than the above-described range, causes the magnetic particles to be insufficiently isolated and become fine insufficiently. As a consequence, a noise at the time of reading/writing increases, and a signal-to-noise ratio (SNR) suitable for high-density recording cannot be obtained.

The content of Pt in the perpendicular magnetic recording layer is preferably 10 at % or more and 25 at % or less. When the content of Pt is within the above-described range, a uniaxial magnetic anisotropy constant Ku required for the perpendicular magnetic recording layer can be obtained, and moreover, the orientation and the crystallinity of the magnetic particles are made satisfactory. Consequently, it is possible to obtain a thermal fluctuation tolerance and a read/write property which are suitable for high-density recording. When the content of Pt is over the above-described range, a layer having a face-centered cubic (fcc) structure is formed in the magnetic particles, which could lead to deteriorations in the orientation and crystallinity. When the content of Pt is less than the above-described range, on the other hand, a thermal fluctuation tolerance cannot be obtained in accordance with a Ku suitable for high-density recording.

The content of Cr in the perpendicular magnetic recording layer is preferably 0 at % or more and 25 at % or less, and more preferably 10 at % or more and 20 at % or less. When the content of Cr is within the above-described range, high magnetisation can be maintained without decreasing a uniaxial magnetic anisotropy constant Ku. As a result, a read/write property which is suitable for high-density recording and a sufficient thermal fluctuation tolerance can be obtained. When the content of Cr is over the above-described range, a thermal fluctuation tolerance deteriorates because a Ku of the magnetic particles is made little, and the crystallinity and the orientation of the magnetic particles deteriorates. As a result, a read/write property deteriorates.

The perpendicular magnetic recording layer may include one or more additive elements selected from B, Ta, Mo, Cu, Nd, W, Nb, Sm, Tb, Ru and Re, in addition to Co, Pt, Cr and an oxide. Since these additive elements are contained, it is possible to stimulate a reduction in the size of the magnetic particles, or to improve the crystallinity and the orientation thereof, thereby enabling to obtain a read/write property and a thermal fluctuation tolerance which are more suitable for high-density recording. The total content of these addictive elements is preferably 8 at % or less. When it is over 8 at %, a phase except for a hexagonal close-packed (hcp) phase is formed in the magnetic particles, and thus, the crystallinity and the orientation of the magnetic particles are disturbed. As a consequence, it becomes impossible a read/write property and a thermal fluctuation tolerance which are suitable for high-density recording.

Examples of a material of the perpendicular magnetic recording layer further include a CoPt-based alloy, a CoCr-based alloy, a CoPtCr-based alloy, CoPtO, CoPtCrO, CoPtSi, and CoPtCrSi. The perpendicular magnetic recording layer may be a multilayer film of Co and an alloy which consists substantially of at least one type selected from the group consisting of Pt, Pd, Rh and Ru. Further, a multilayer film such as CoCr/PtCr, CoB/PdB, or CoO/RhO having Cr, B or O added may be used as the each layers of the multilayer thereof.

The thickness of the perpendicular magnetic recording layer is preferably 5 to 60 nm, and more preferably 5 to 30 nm. A perpendicular magnetic recording layer having a thickness within this range is suitable for high-density recording. When the thickness of the perpendicular magnetic recording layer is less than 5 nm, there is a tendency that a regenerative output is too low, which is lower than a noise component higher. When the thickness of the perpendicular magnetic recording layer is over 40 nm, on the other hand, there is a tendency that a readout output is too high, which distorts a waveform. A coercivity of the perpendicular magnetic recording layer is preferably 237000 A/m (3000 Oe) or more. When a coercivity is less than 237000 A/m (3000 Oe), there is a tendency that a thermal fluctuation tolerance declines. A perpendicular gradation of the perpendicular magnetic recording layer is preferably 0.8 or more. When the perpendicular gradation is less than 0.8, there is a tendency that a thermal fluctuation tolerance declines.

<Protective Layer>

The protective layer prevents corrosion of the perpendicular magnetic recording layer as well as damage of the surface of the medium when the magnetic head touches a medium. Examples of a material of the protective layer include a material containing C, $SiO_2$, and $ZrO_2$. A thickness of the protective layer is preferably made to be 1 to 10 nm. When the thickness of the protective layer is made to be within the above-described range, spacing between the head and a medium can be made less, which suitable for high-density recording.

Carbon can be classified into $sp^2$-bonded carbon (graphite) and $sp^3$-bonded carbon (diamond). The $sp^3$-bonded carbon is superior in the durability and the corrosion resistance to that of graphite. However, because the $sp^3$-bonded carbon is crystalline, the smoothness on a surface thereof is inferior to that of graphite. Usually, carbon is formed to be a film by sputtering using a graphite target. In this method, amorphous carbon in which $sp^2$-bonded carbon and $sp^3$-bonded carbon are mixed is formed. Carbon in which a ratio of $sp^3$-bonded carbon is high is called diamond-like carbon (DLC). Since the DLC is excellent in the durability and the corrosion resistance, and is excellent in the smoothness on a surface thereof as well because of amorphous, it is utilized as a surface protective film for the magnetic recording media. With respect to film formation of DLC by a chemical vapor deposition (CVD) method, DLC more rich in $sp^3$-bonded carbon can be formed by satisfying the conditions because DLC is generated by exciting and decomposing a raw gas in plasma, and due to a chemical reaction thereof.

<Lubricant Layer>

Examples of a lubricant agent include per-fluoro-polyether, alcohol fluoride, and fluorinated carboxylic acid.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A method for manufacturing a magnetic recording medium, comprising:
    forming a ferromagnetic recording layer having an opening or recess on a substrate at positions corresponding to a recording track section and a servo section;
    forming a protective film on the ferromagnetic recording layer to cover a part of a surface of the ferromagnetic recording layer adjacent to the opening or recess with the protective film, the protective film being made of diamond-like carbon;
    forming a flattening film on the protective film such that the flattening film covers the protective film at a position of the part of the surface of the ferromagnetic layer adjacent to the opening or recess and fills the opening or the recess, the flattening film being made of $SiO_2$; and
    subjecting the flattening film to an ion beam-etching to expose the part of the surface of the protective film adjacent to the opening or recess, an end point of the ion beam-etching being determined on the basis of a change in a total number of incident particles monitored by a quadrupole mass spectrometer, and the quadrupole mass spectrometer being installed such that the quadrupole mass spectrometer monitors particles sputtered in a direction forming an angle within a range of 50° to 70° with respect to a direction perpendicular to the substrate as the incident particles.

2. The method according to claim 1, the incident particles monitored by the quadrupole mass spectrometer includes particles having a mass number of 60.

* * * * *